April 23, 1957 J. E. MARTIN 2,789,668
PORTABLE STORAGE SHELTERS
Filed Dec. 3, 1952 4 Sheets-Sheet 3
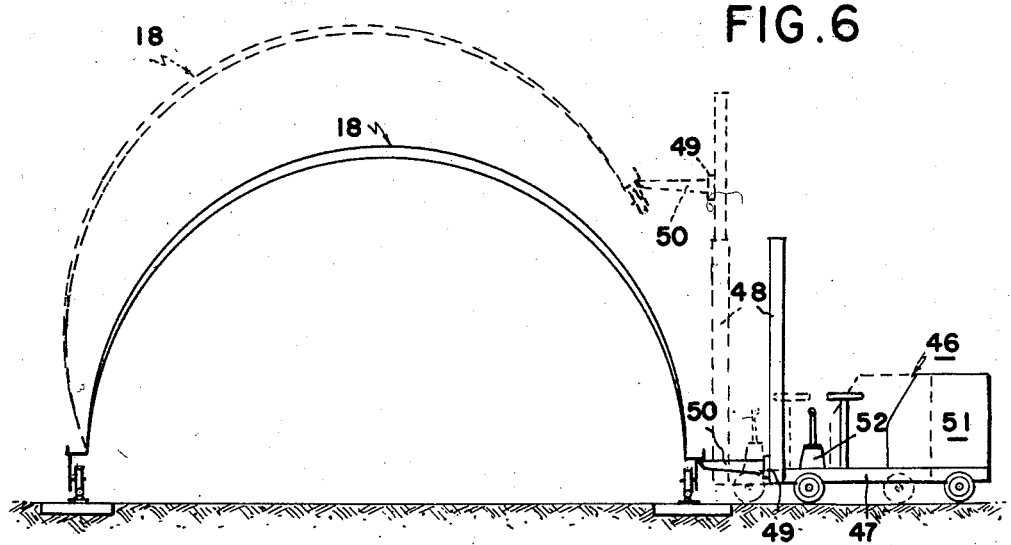
FIG.6
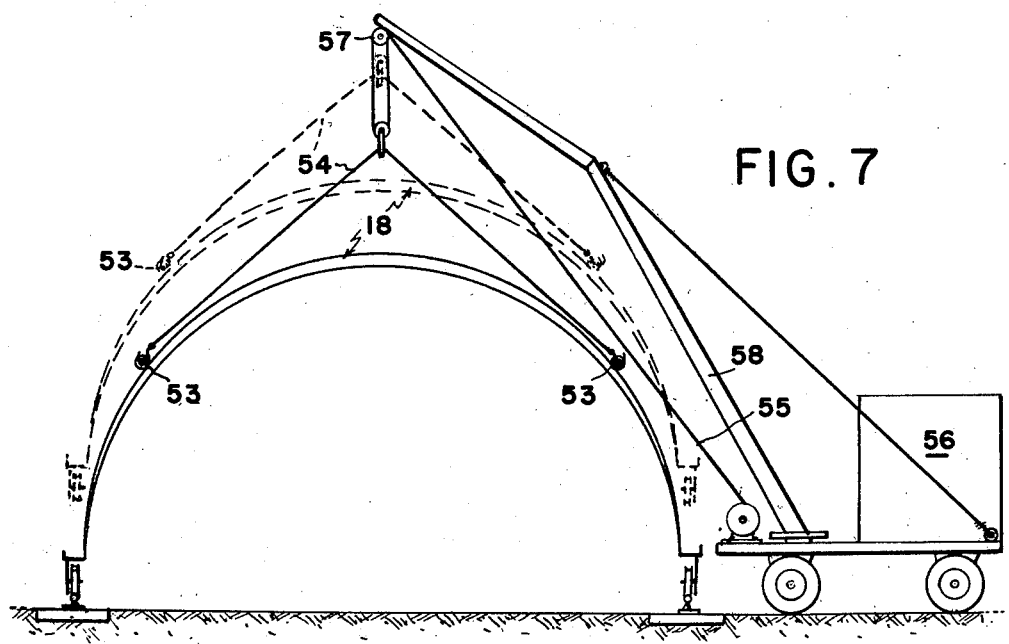
FIG.7
INVENTOR
JOSEPH E. MARTIN,
BY 
ATTORNEY April 23, 1957   J. E. MARTIN   2,789,668
PORTABLE STORAGE SHELTERS
Filed Dec. 3, 1952   4 Sheets-Sheet 4
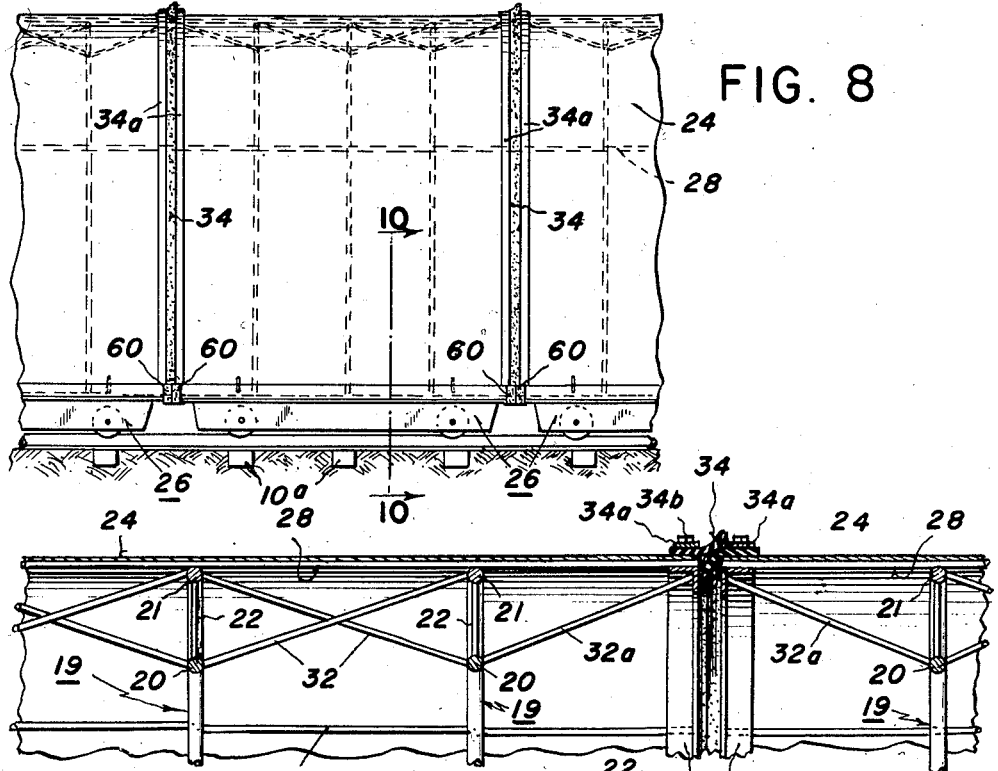
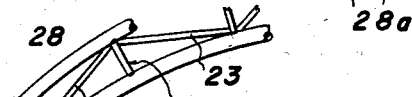
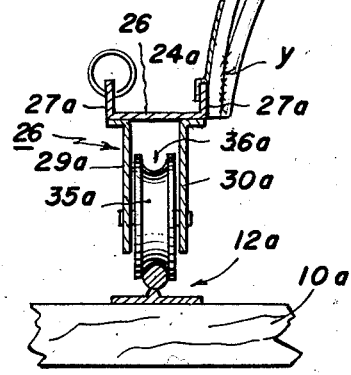
INVENTOR
JOSEPH E. MARTIN,
BY
ATTORNEY

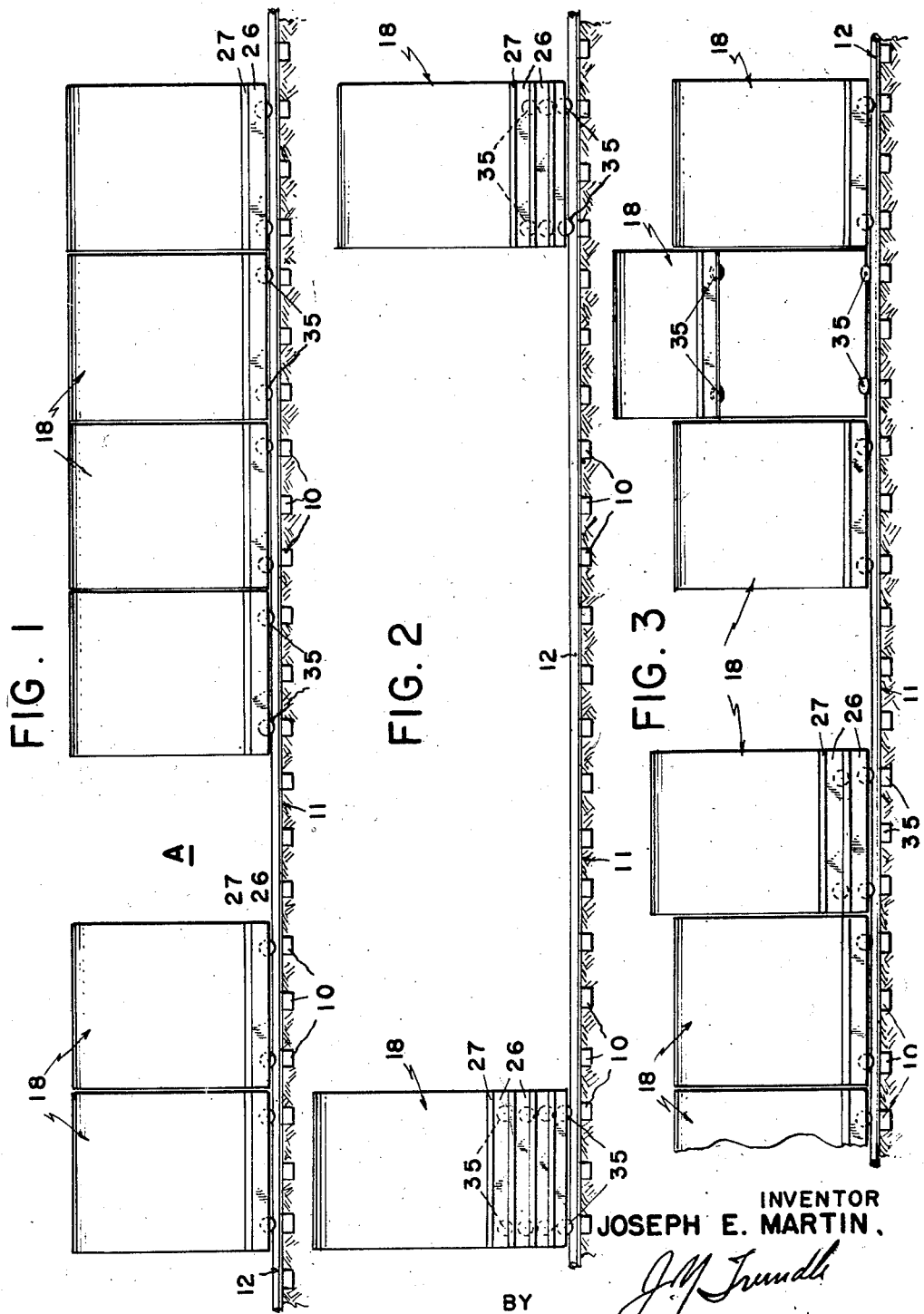

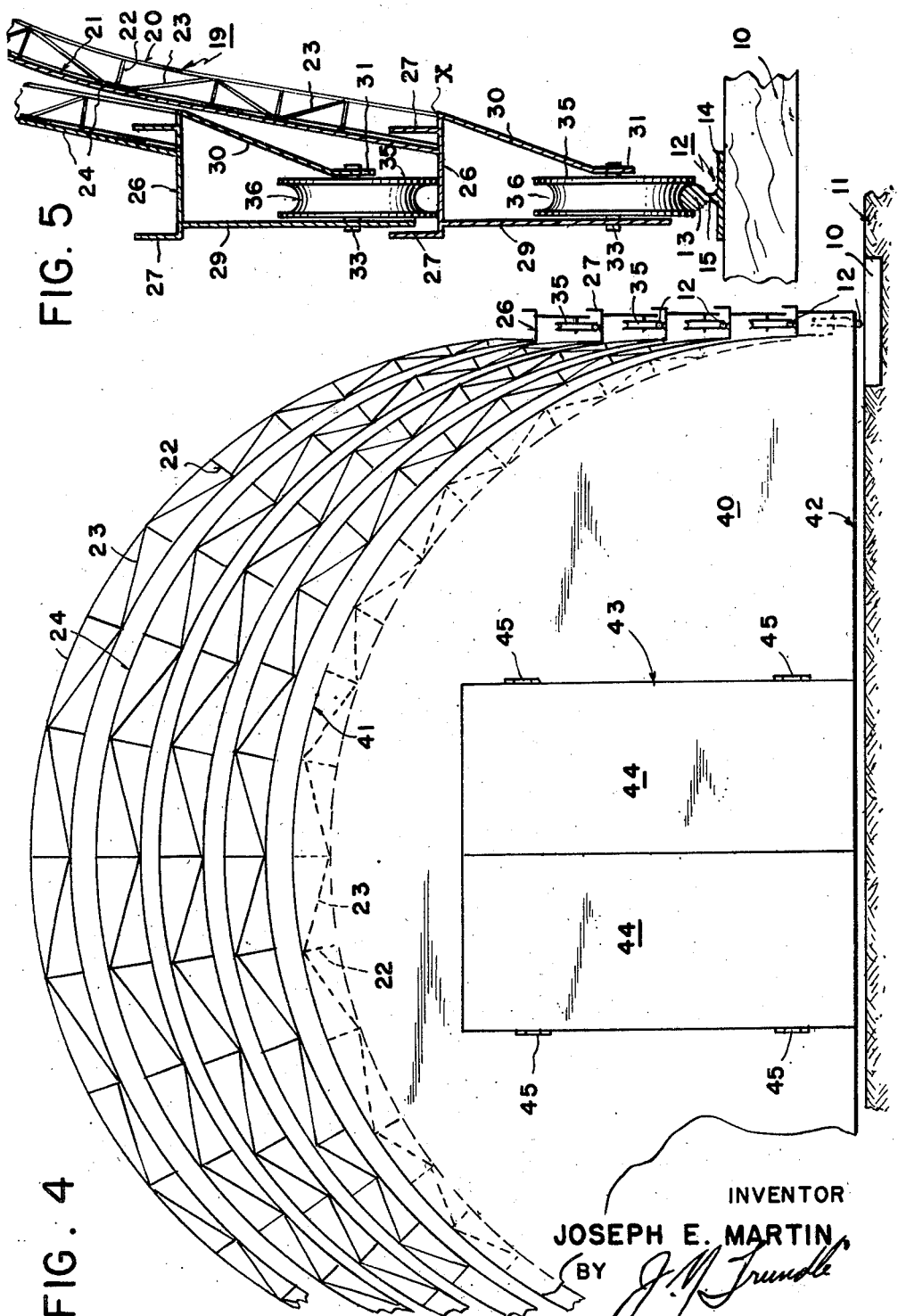

United States Patent Office 2,789,668
Patented Apr. 23, 1957

2,789,668

PORTABLE STORAGE SHELTERS

Joseph E. Martin, Detroit, Mich.

Application December 3, 1952, Serial No. 323,878

3 Claims. (Cl. 189—2)

The present invention relates to improvements in portable metallic building structures, and more particularly to a sectional building structure to provide a storage and shelter for various kinds and types of machinery, equipment, materials and different commodities and products.

One object is to provide a portable prefabricated metallic storage shelter composed of a series of arched units arranged longitudinally along a trackway and constructed to permit preselected sections throughout the length of the building structure to be tilted, telescoped, nested one on the other, shifted apart or split and rolled clear to give free and ready access to the stored objects and to permit freedom, convenience and economy of outdoor handling, and yet provide the security of all-weather protection of indoor storage.

Another object of the invention is to provide a portable sectional metallic building structure which can be quickly and easily erected, and which can be conveniently handled to facilitate the storage of various pieces of machinery and the like.

Another object is to provide a sectional metallic building structure formed of prefabricated arched cover sections slidably mounted on a trackway and arranged to be moved longitudinally along said trackway to permit access to various objects stored in said structure.

Another object is to provide a portable metallic building structure formed of a series of sectional cover units arranged in longitudinal relation and erected to be nested one on top of the other in such a manner as to permit ready access to any section of the building structure for storing or removing various pieces of equipment or machinery.

Another object is to provide a portable metallic building structure which will provide all-weather protection and will open with adequate head room, clear spaces and unobstructed floor space to enable fast and rapid handling of modern machinery and handling equipment.

Another object is to provide a portable sectional building structure which is composed of a series of cover units of trussed arch construction with rollers or grooved wheels located at spaced apart distances at each side of the unit such that each unit can be conveniently and quickly shifted longitudinally, and thereby enable various portions of the building to be opened for storing or removing various pieces of industrial equipment and similar materials.

Another object is to provide a portable prefabricated storage shelter constructed of sectional cover units having arch-shaped trussed frame structural members provided with corrugated sheathing on the outer side of said arched truss members.

Another object is to provide a portable prefabricated metallic building structure for storing various pieces of machinery and equipment which can be conveniently erected in industrial yards and the like, and can be easily increased or decreased in size by merely adding or removing any number of sectional units and controlling the length of the supporting tracks.

Another object is to provide a portable metallic storage building structure in which the various sectional cover units can be easily shifted, nested or telescoped by the use of an overhead crane to permit the storing of heavy industrial machinery and equipment which can be best handled by cranes.

Another object is to provide a portable metallic storage building structure in which the sectional cover units can be easily and conveniently tilted by the use of a fork lift truck or other industrial lift to facilitate the storing of relatively light machinery and equipment without disturbing adjacent units or machinery stored thereunder.

Another object is to provide a portable metallic storage building structure in which the various cover units can be rolled apart or separated longitudinally to accommodate loaded trucks and trailers for permitting the storage of lumber and other building materials which are more readily handled by straddle trucks.

Another object is to provide a portable metallic storage building in which the various sectional units can be telescoped together, nested one on the other, tilted or separated to accommodate the passage of autos, trucks and various other motor vehicles, as well as road building equipment, farm and contractors machinery and other wheeled vehicles and equipment.

Another object is to provide a portable metallic storage building structure composed of a series of sectional cover units, and to provide the end units with vertical partition walls, having doors and windows to permit access and egress without necessitating the disturbance of the sectional units when products and machinery are stored in said building.

Another object is to provide a metallic storage building structure in which each of the sectional units is provided along its side edges with a channel-shaped trackway adapted to receive the supporting rollers or wheels of an adjacent unit when the units are arranged in nested or telescoped position.

Another object is to provide a metallic storage building structure composed of a series of cover units which can be employed for temporarily storing equipment and machinery, and which can be used individually to cover certain pieces of machinery and equipment until the same are stored in order.

Another object is to provide a metallic storage building structure which can be conveniently used in repair fields either individually or in series to protect materials, workmen, excavations and other ground openings from weather conditions.

Another object is to provide a metallic storage building structure which can be easily and conveniently transported by a truck and erected by a crane so that erection on a preselected location can thus be accomplished, quickly and rapidly without employing skilled workmen.

Another object is to provide a metallic storage building structure which can be used on construction jobs such as in building air fields in remote locations, and as repair shops for construction work.

Another object is to provide a metallic storage building structure in which a preselected cover unit can be tilted vertically and laterally to give access to the storage space without necessitating removal of other cover units or disarranging other stored equipment or machinery.

Another object is to provide a metallic storage building structure in which a series of separable cover units are arranged in longitudinal alinement and supported on a pair of spaced apart trackways supported on individual tie members, such that the separable cover units can be moved longitudinally along said trackway in opposite directions to separate a pair of adjacent units, and thereby gain access to the storage space therebetween.

Another object is to provide a portable sectional building structure having an arched frame which is composed of a series of trussed arch members connected in spaced apart relation by longitudinally extending brace rods and interbraced one from the other by diagonal brace rods connecting the outer structural arch member of one trussed arch to the inner structural member of an adjacent trussed arch.

Another object is to provide a portable sectional storage shelter in which the meeting edges of the sectional units are provided with flexible sealing strips to exclude moisture and protect the stored equipment and material from severe weather conditions.

Another object is to provide a portable sectional storage building in which all of the sectional units are provided with channel trackways at the sides thereof which in addition to providing a support for an adjacent unit when they are stored in nested relation, forms a continuous eaves trough along each side of the building.

Another object is to provide a sectional building unit for storage facilities having a sheathing or covering of translucent fiber glass, which is a silicious product of spun fibers molded or otherwise shaped in the form of an arch with corrugations therein extending transversely to reinforce the cover structure.

Other objects and advantages of the invention will become apparent during the following description of the accompanying drawings, wherein:

Figure 1 is a side elevational view of the metallic storage building structure, showing certain of said building units arranged on a trackway with other units moved to a position to enable access to the storage space therebetween.

Figure 2 is a side elevational view of the metallic storage building structure, showing certain building units nested one on top of the other at each end of the trackway to enable access to the storage space therebetween and facilitating the storing or removal of machinery equipment or material.

Figure 3 is a side elevational view of the portable storage building structure, showing the manner in which the sectional units can be telescoped one on the other and also the manner in which the sectional cover units can be tilted or rocked about one of their supporting edges to permit access to the storage space.

Figure 4 is an end elevational view of the portable storage building, showing the manner in which a partition or wall member is installed in the end cover units to close said end units and to provide swinging or sliding doors therein for admitting workmen or the like without disturbing the storage arrangement.

Figure 5 is an enlarged fragmentary vertical cross-sectional view showing a portion of the cover units and the channel tracks for receiving the supporting rollers or wheels of a nested or telescoped cover unit which also serves as an eaves trough.

Figure 6 is a diagrammatic view, showing the manner in which a preselected cover unit can be tilted or rocked about one of the trackways as the pivot axis by means of an industrial lift truck.

Figure 7 is a schematic view, showing the manner in which a hoist sling operated by a crane boom can be employed for lifting the cover units vertically, and stacking the same one on the other in internested relationship.

Figure 8 is a longitudinal side elevational view showing a fragmentary portion of the sectional portable storage building, and illustrating the manner in which the end edges are provided with flexible sealing strips to seal the joint between meeting edges of adjacent sectional units.

Figure 9 is a longitudinal fragmentary cross-sectional view illustrating the manner in which the trussed arch members are connected by a longitudinal series of spacing rods, and showing the manner in which the structural members of the trussed arches are interbraced by diagonal brace bars. Also, the sealing members between adjacent edges of sectional units are shown in sealing contactual engagement; and Figure 10 is a fragmentary transverse cross-sectional view showing a slightly modified wheel support for the arched truss members.

In the drawings, and more in detail, there is shown for the purpose of illustration a preferred embodiment of the invention, and attention is first directed to Figures 1 to 9 wherein there is shown a series of relatively short tie members 10 arranged along a pathway in spaced apart relation and partially imbedded in the ground surface 11 or, if desired, ballast can be distributed between the tie members or the tie members can be imbedded in a concrete floor somewhat in the manner shown in Figures 3 and 4. The tie members are relatively short (Fig. 4) and are arranged in spaced apart rows along each side of an area defining a floor space. The ground 11 may be provided with a hard concrete or other surface between the spaced rows of tie members 10 to form a substantially level and smooth floor. Mounted on each row of tie members 10 is a rail generally designated 12, and said rail includes a tread portion 13 of round cross-section connected to a base 14 by means of a web portion 15. The base portion 14 of each rail is affixed to the tie members 10 by spikes or other fastening elements.

The rails 12 extend beyond the confines of the storage area or floor space a distance substantially equal to two cover units. Each cover unit 18 is formed of a series of arch shaped truss members generally designated 19 having inner and outer structural frame members which are preferably of round section, said inner and outer frame members are reinforced by transverse bars 22 and alternately extending diagonal truss bars 23. The arched truss members 19 are spaced apart approximately four feet one from the other, and are connected by a series of equidistantly spaced rods 28 extending longitudinally and welded or otherwise secured to the outer structural members 21 of the arch members. The longitudinally extending rods 28 are of a length sufficient to project beyond the endmost arched truss members 19 and have their ends connected to an arcuate band 28a of angle cross-section. The longitudinal rods 28 have their ends welded or otherwise affixed to the arcuate bands 28a.

Extending between the arched truss members 19 at various circumferential locations is a series of diagonal brace bars 32 which extend from and are connected to the outer structural member 21 to the inner structural member 20 of an adjacent trussed arch member 19 (Fig. 9). The ends of the diagonal interbraced bars 32 are welded or otherwise secured in place. Extending between the inner structural members of the endmost trussed arch members 19 and the arcuate band 28a at each end of the structure, is a diagonal brace bar 32a.

The frame structure thus formed by the trussed arch members is provided with a cover or outer sheathing 24 which is preferably formed of corrugated stock such as translucent molded fiber glass which is a silicious molded product formed from spun glass fibers. Any desired coloring may be incorporated, but it is intended to employ a color which will exclude infra-red rays to reduce the temperature of the building interior. Other forms of sheathing can be used such as corrugated aluminum sheeting or corrugated galvanized steel sheathing. Rivets or threaded fasteners (not shown) are provided for securing the sheathing 24 to the trussed frame structure formed by the structural arch members 19.

Secured along the lower edge of each trussed member 19 and arranged at each side of the cover unit 18 is a channel member 26 having upstanding flanges 27 (Fig. 5). The lower ends of the inner and outer structural frame members 20 and 21 are welded or otherwise secured to the angle plate 26 or channel member as at X, and similarly the lower edge of the sheathing 24 may be secured to the channel member 26 and may be secured thereto by welding if the sheathing is formed of metal. However, if the sheathing is formed of a plastic translucent material the lower edges may simply rest on the floor of the channel 26, since suitable fastening elements will be provided throughout the arched frame structure. The channel member 26 extends the entire length of each cover unit and is of a width sufficient to form a channel-shaped trackway and eaves trough along each side of each sectional unit.

Extending downwardly from the channel member 26, and also welded or otherwise secured thereto, is a wheel supporting plate 29 which is substantially parallel with the upturned flange 27. Also secured as by welding to the channel member 26 is an angularly extending wheel supporting plate 30 (Fig. 5), and said wheel supporting plates 29 and 30 likewise extend the full length of each sectional cover unit 18. The plates 29 and 30 are spaced apart to accommodate a grooved wheel 35 having a tread 36 which is shaped to conform to the tread 13 of the rail 12. The lower end of the angular wheel supporting plate 30 terminates in a portion 31 parallel with the portion 29, and said portions 29 and 31 are provided with alined bearing openings for accommodating a short axle shaft 33 which passes through a bearing in the wheel 35 and is locked in place to prevent axial displacement. Thus, the sectional units 18 can be moved along the trackway formed by the rails 12 without danger of being laterally displaced or from becoming disengaged from their supporting tracks.

In order to prevent moisture from passing between the meeting edges of adjacent sectional units 18, flexible rubber sealing strips 34 (Fig. 9) are secured to the edges and have a portion clamped beneath a plate 34a which is attached to the arcuate band 28a by a series of equidistantly spaced fastening elements 34b. The rubber sealing elements 34 may be formed of synthetic rubber composition such as neoprene to withstand considerable flexing and extreme weather conditions. The rubber sealing strips 34 are of a width to permit one marginal edge to overhang the edge of the cover 24 in a plane parallel with said cover. Normally, the sealing flaps 34 on the meeting edges of the sectional units will be positioned such that when one cover unit is placed in abutting relation with another cover unit, one of the sealing strips will bend downwardly and inwardly while the free edge of the other sealing strip will flex upwardly and outwardly. Thus, any one of the sectional units may be elevated or displaced relative to a pair of adjacent units, and when the removed unit is again placed in operative position the sealing strips of the sectional units on each side thereof will be bent inwardly, while the sealing strips on the replaced unit will be flexed outwardly.

It is intended to provide similar rubber sealing elements 60 located at the ends of the channel members 26 so that when the sectional cover units are placed in abutting relation, the several channel members 26 will form a continuous eaves trough.

In the optional form of the invention shown in Figure 10, the arched frame structure is substantially the same as before and includes inner and outer structural members 20 and 21 which are formed of rod or tubing stock of round section. The structure is braced by transverse brace bars 22 and diagonal brace bars 23. The cover 24 is placed in position to overlie the rods 28 which extend longitudinally and connect the arch members 19 one to the other in spaced relation. Also, the arch members 19 are interbraced by brace bars 32. The lower ends of the structural arch members 20 and 21 converge and are welded together as at y. A channel member 26a is welded along the lower ends of the outer structural arch member 21 to form a trackway and eaves trough similar to the channel member 26 in Figures 1 to 9 inclusive. The side edges of the cover sheathing 24 is offset as at 24a to fit over one of the upstanding flanges 27a of the channel member 26a. Secured to the underside of the channel member 26a as by welding or the like, is a pair of angle plates 29a and 30a between which is mounted two or more supporting wheels 35a having grooved treads 36a to receive the rail tread 12a. The rails 12a are mounted on short ties 10a as previously described.

It is intended that the structural arch frame also be provided with arcuate strips 28a of angle section at the ends thereof with rubber sealing strips 34 secured thereto by additional clamping strips 34a.

When a series of six or more sectional units 18 are arranged on a trackway as shown in Figure 1, it is desirable to close the ends of the building structure to exclude moisture and to protect the stored material from extreme weather conditions, and as shown in Figure 4 suitable end walls 40 are provided and are shaped to fit the arcuate contour of the trussed frame members 19, thus providing an arcuate edge 41 and a lower straight edge 42 spaced a slight distance from the ground surface 11 to permit longitudinal movement of the endmost sectional cover units 18. The end wall partition 40 is provided with an access opening 43 adapted to be closed by a pair of closures 44 which may be of the horizontal swinging or sliding type as desired. As shown in the drawing, the closures 44 are hinged as at 45 to swing horizontally and thus provide an opening in the partition 40.

While only one end partition wall 40 is shown (Fig. 4), it is to be understood that the opposite end of the shelter will be provided with a similar partition wall, likewise having an access opening provided with suitable closures. It is intended that only certain sectional shelter units be provided with partitions such as those used at the opposite ends of a complete storage shelter.

The arched trussed beams 19 are constructed and interbraced in such a manner as to omit structural members and beams which would interfere with head space, and are sufficiently rigid to be self-supporting by the side mounts along the side edges.

Attention is directed to Figures 6 and 7, wherein there is shown schematically the manner in which the sectional cover units 18 may be displaced for the purpose of gaining access to the intermediate portion of an assembled storage building. In Figure 6 there is shown an industrial lift truck 46 including a wheeled frame 47, on the front end of which is arranged a pair of spaced uprights 48 for accommodating a sliding crosshead 49. Mounted on the crosshead as usual is a load engaging platform 50, and the crosshead 49 is adapted to be raised and lowered by means of an actuator screw driven by a motor 51 through suitable gearing mounted in a gear casing 52.

In Figure 7 each of the cover units 18 may be provided with a length of cable having its ends affixed to one of the longitudinal rods 28. But as shown in the drawing, spaced apart cable receiving eyes or bolts 53 are attached to a pair of rods 28 and the cable 54 is connected to the eyes 53 so that the length of cable 54 may be engaged by the tackle hook of a hoist cable 55 which is controlled by a crane 56, and passes over a sheave or pulley 57 on the upper end of the boom 55 of said crane 56.

In operation, it will be assumed that six or more cover units 18 are arranged in alinement on the trackway 12, and that suitable partition walls 40 are provided for closing the endmost cover units. If it is desired to gain access to the intermediate portion of the storage shelter, certain sectional units on the right and left ends of the trackway 12 (Fig. 1) are moved longitudinally apart at the preselected space such that the cover units will be separated as at A (Fig. 1) a sufficient distance to permit trucks, cranes, machinery or other products to be stored to be moved into the area A, after which the cover units 18 are again moved longitudinally along the trackway 12 toward one another until they are in abutting relation with their sealing strips 34 in intimate contactual engagement.

Should it be desired, the longitudinal movement of the individual cover units 18 can be accomplished by manually sliding the cover units apart somewhat in the same manner in which a sliding door is operated.

Should it be desired to expose or gain access to several areas for the storage or removal of equipment and material and the like, the individual cover units 18 are lifted by means of a crane 56 (Fig. 7) free of the trackway 12, and are nested one on the other at each end of the trackway (Fig. 2), with the supporting wheels of the uppermost or superposed cover units 18 supported in the channel trackway 26 and 26a at each side of an adjacent lowermost cover unit (Fig. 5). In Fig. 2, the cover units 18 are shown in their nested and telescoped positions arranged one on top of the other with three or more cover units nested or telescoped at each end of the trackway to thus expose a relatively large area between the tracks and between the ends thereof.

When storing or removing any products not requiring maximum head space such as vehicles and equipment which requires a displacement of only one preselected cover unit, the lift hoist 47 (Fig. 6) or other means may be employed to lift the unit. In the drawing, the lift hoist 47 is moved into position at the side of the cover unit with the lift platform 50 presented to and extending beneath the channel member 26. Thus when the platform is elevated by operation of the motor 51 of the hoist 47, the cover unit will be swung vertically about the horizontal axis of the rail tread 13 on the opposite side of the cover unit. The cover unit may be held in position by suitable props (not shown), while products or commodities are stored or removed from the storage shelter. Also, if desired, the crane 56 can be used for tilting a pre-selected cover unit and the cover unit may be held in its raised position or tilted relation by the crane hoist sling employed.

The sectional cover units 18 can be used individually for the purpose of sheltering industrial and other plant machinery by placing the cover unit over the equipment in the field. In handling industrial machinery, it is necessary for moving such qeuipment to employ large cranes. Since such large cranes are necessary to remove the equipment trucks, the same crane can be employed for lifting the sectional cover units 18 to a position shown in Figure 2 so that the equipment may be stored on the floor surface between the rails 12 of the trackway, and then the cover units are again placed on the trackway to enclose the equipment thus deposited.

When the cover units 18 are not being used, they can be nested one on top of the other as shown in Figure 2 to conserve space and be conveniently stored in a comparatively small area.

Thus it will be seen that a relatively large storage space can be obtained by arranging the sectional cover units in series along a pathway or track which will provide a clear span area without interfering cross beams or frame structures, and that the units can be conveniently nested one on top of the other with the wheels of one unit supported on the channelways of an adjacent unit without causing the trussed frame members or sheathing to be sprung out of shape. The positioning of the sectional units 18 when arranged in nested relation is such that sufficient space is provided between the sheathing and trussed frame members of adjacent stacked units to prevent the contacting thereof and the elimination of expansion or spreading of uppermost units, which results when arch-shaped units of the same radii are placed one upon the other. This is due to the fact that the inner diameter or diametral distance between the lower edges of the units is smaller than the diametral distance between the sheathing.

It is to be understood that the forms of the invention herewith shown and described are to be taken as preferred embodiments of the invention, and that various changes in the shape, size and arrangement of parts may be resorted to without departing from the spirit of the invention or the scope of the subjoined claims.

What I claim is:

1. In a portable building structure, a series of arch-shaped cover units of uniform and equal dimensions adapted to be arranged in longitudinal alinement and edge to edge relation, to provide a continuous shelter structure, a series of supporting wheels mounted on the lower portions of said cover units along each side thereof, and an outwardly directed channel shaped trackway mounted above said wheels at each side of said cover units to receive the supporting wheels of an adjacent unit, whereby said cover units are adapted to be nested or extended.

2. In a portable metallic storage building structure, a pair of rails arranged in spaced relation to provide a trackway, a series of arch-shaped cover units of uniform and equal dimensions on said trackway, supporting wheels arranged on each side of each of said cover units having grooved tread rims to receive said rails, and an outwardly directed channelway mounted on each side of each cover unit above said supporting wheels, said channelways being located in a position to receive the wheels of an adjacent cover unit, whereby said cover units are adapted to be nested or extended.

3. In a portable storage building structure, a series of trussed arched frame members of uniform and equal dimensions, a series of horizontal structural members connecting said frame members in spaced apart relation, interbracing between said frame members extending between inner and outer trussed frame members, a sheathing covering said frame structure and extending beyond the edges thereof, brace members for bracing the projecting ends of said sheathing, resiliently sealing strips projecting from the ends of said sheathing to engage a sheathing strip of an adjacent storage unit, handling rings along the side edges of the building structure, said side edges being provided with outwardly directed channel shaped longitudinally extending members to form trackways and eaves troughs at each side of the building structure and supporting wheels on each side of said building structure located beneath said channel-shaped members, whereby said building structures are adapted to be nested or extended.

References Cited in the file of this patent

UNITED STATES PATENTS

| | | |
|---|---|---|
| 1,470,557 | Eremeeff | Oct. 9, 1923 |
| 1,896,433 | Windeknecht | Feb. 7, 1933 |
| 2,688,068 | Marr | Aug. 31, 1954 |

FOREIGN PATENTS

| | | |
|---|---|---|
| 263,635 | Great Britain | Jan. 6, 1927 |
| 566,844 | Germany | Dec. 24, 1932 |
| 44,164 | France | Aug. 20, 1934 |